Sept. 25, 1928.  G. EGLOFF ET AL  1,685,483

PIPE CONNECTION

Filed Nov. 10, 1920

Patented Sept. 25, 1928.

1,685,483

UNITED STATES PATENT OFFICE.

GUSTAV EGLOFF AND HARRY P. BENNER, OF INDEPENDENCE, KANSAS, ASSIGNORS TO UNIVERSAL OIL PRODUCTS COMPANY, OF CHICAGO, ILLINOIS, A CORPORATION OF SOUTH DAKOTA.

PIPE CONNECTION.

Application filed November 10, 1920, Serial No. 423,018. Renewed March 12, 1926.

This invention relates to improvements in pipe connections and refers more particularly to return bend connections in tubes which have been nested in banks to form heating coils, or the like.

Among its salient objects are to provide a connection taking the form of a U-bend which is easily removed and connected into a system and one that assures a pressure-tight connection when in place; to provide a return or U-bend construction that eliminates the necessity of washers, gaskets and other appliances usually essential in making pipe connections tight against high pressure; to provide a connection that is sturdy of construction and one in which the joining portions may be easily cleaned of foreign matter which would lodge in a position to hinder intimate cooperation of the engaging parts, and to provide a return bend connection that is particularly adapted for high pressure systems and, in addition, systems where a high degree of heat is used in combination with high pressure.

Figure 1:
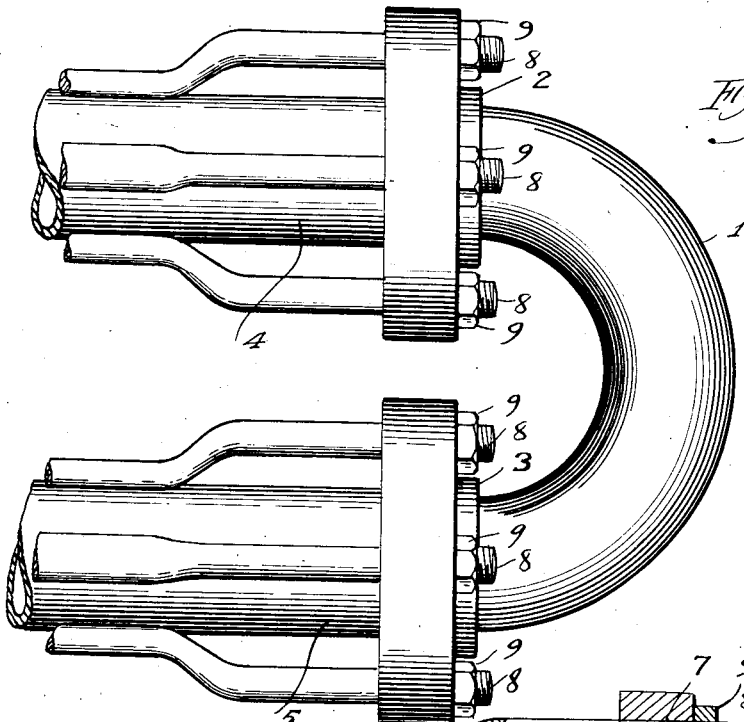
Figure 1 is a side elevation of the return bend pipe connection joining two pipe lines.
Figure 2:
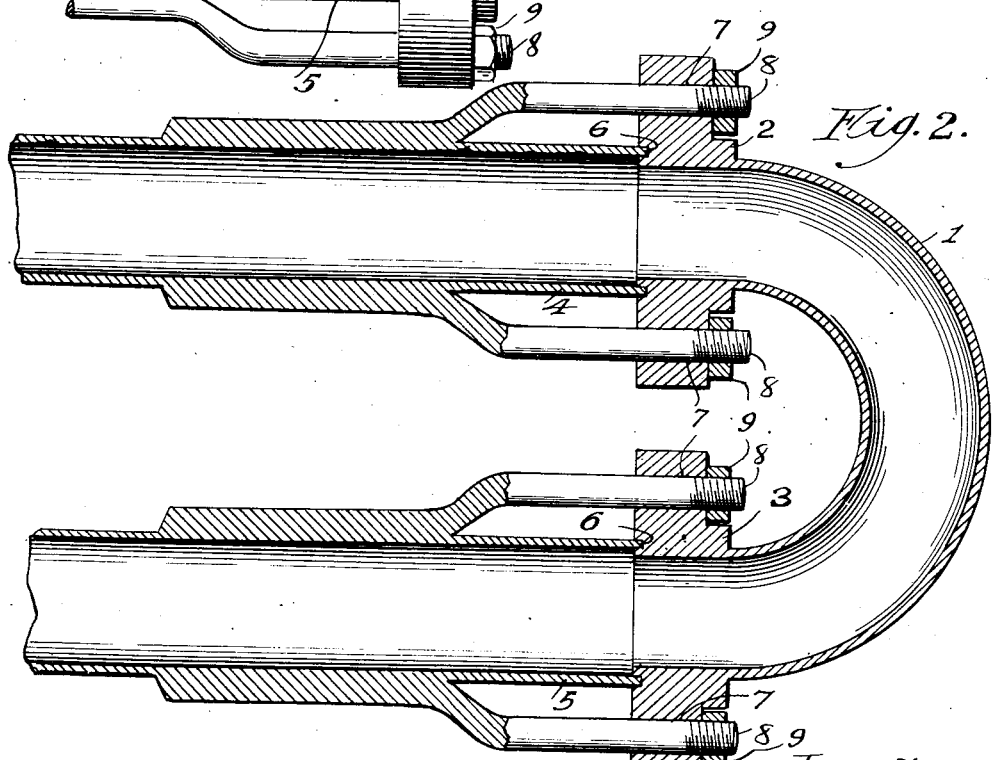
Fig. 2 is a sectional side view of the construction shown in Fig. 1.

Referring to the drawings, the pipe connection comprises a connecting tube 1 which takes the form of a U or return bend having two end flanges 2 and 3. These end flanges abut upon the pipes 4 and 5 and are recessed at 6 to receive the ends of the pipes. These circular recesses may be ground or cut so that they fit snugly with the pipe ends and the connecting pipes shown at 4 and 5 should have their ends ground or squared in a manner so that the flanges will set evenly in the grooves or recesses. The flanges 2 and 3 are preferably welded to the tube connection 1 and are apertured at 7 to accommodate the offset bolts 8. These bolts 8 are welded or otherwise rigidly fastened to the outer periphery of the pipes 4 and 5 either by spot welding or by other means whereby the offset bolts may serve to draw the flanges to the ends of the pipe forming a pressure-tight connection. The ends of these offset bolts, which pass through the flanges, are threaded to accommodate the nuts 9 when the flanges have been fitted against the pipe ends so that the circular grooves in the flanges fit the shell of the pipes. The nuts are screwed upon the offset bolts and draw the flanges tightly against the ends of the pipes. In this manner the U or return bend eliminates the use of gaskets, washers or other means for making the pipe connections pressure tight. The pipe ends, fitting snugly in the grooves in the flanges and being drawn up by means of the nuts on the offset bolts, assure a pressure-tight connection between the joining tubes. These connections are particularly adapted for use where a plurality of pipes, such as heating tubes, are nested together in banks and so connected that fluids are circulated therethrough for heat treating.

One of the particular advantages of this construction is its simplicity and the fact that gaskets, packing and other means for making pressure-tight joints may be entirely eliminated from the system and innumerable difficulties relative to the common means for making pressure-tight connections.

We do not wish to restrict ourselves to this particular type of pipe connection as the idea is adaptable to a straight pipe joint or other pipe joint shapes.

We claim as our invention:

1. A pipe connection of the character described, comprising a connecting pipe length interposed between a pair of pipes to be united having unflanged ends, apertured flanged ends fixed to said connecting length being circularly grooved along one face thereof and adapted to receive in said grooves the pipe ends, and means comprising rigid extensions formed integral with the pipes and having end portions spaced therefrom adapted to register with the apertures in said flanges for tightly drawing the flanges against said pipe ends to form pressure tight joints without the aid of packings.

2. A pipe connection of the character described comprising a connecting length interposed between pipes to be united, apertured flanges fixed to the ends of said length, each flange having a circumferential circular groove in the exposed face thereof, separated bolts rigidly connected with the pipes and having portions spaced therefrom adapted to pass through the apertures in the flanges whereby the pipe ends may be tightly drawn into the grooves in said flanges of the connecting length to form a pressure tight connection.

3. An article of manufacture comprising a pipe section having annularly spaced bolt members, one end of each of said bolt members being formed integrally with said pipe section, the opposite end of each of said bolt members being spaced from said pipe section and projecting a substantial distance beyond the end of said pipe section.

4. In a pipe connection, the combination with a pipe section having annularly spaced bolt members, one end of each of said bolt members being formed integrally with said pipe section, the opposite end of each of said bolt members being spaced from said pipe section and projecting a substantial distance beyond the end thereof, a joint connection, a collar carried by said joint connection, said collar being apertured to receive said bolt members, and nuts for holding the pipe section and joint section in assembled relation.

GUSTAV EGLOFF.
HARRY P. BENNER